Nov. 30, 1943.　　H. K. KOUYOUMJIAN　　2,335,425
APPARATUS FOR REDUCING EFFECTS OF SHOCKS
Filed April 30, 1942　　2 Sheets-Sheet 1
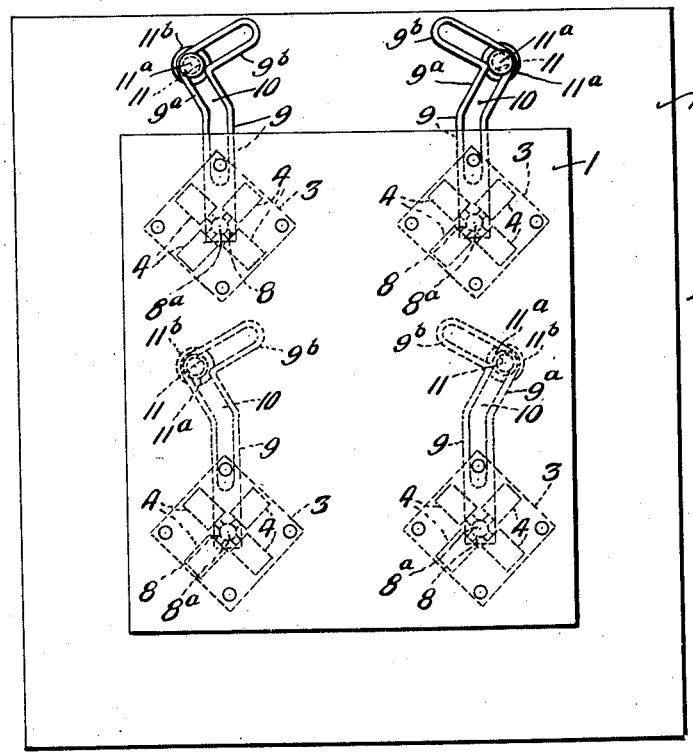
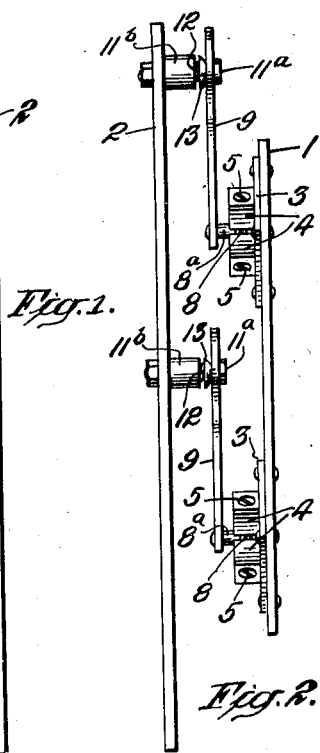
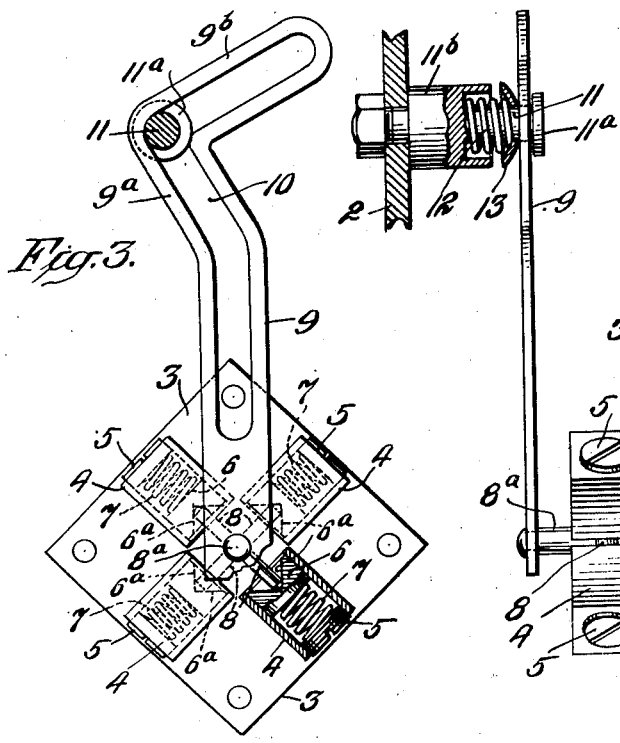
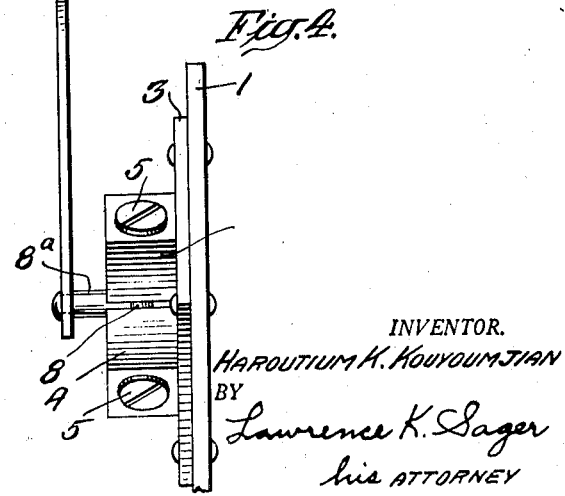
INVENTOR.
HAROUTIUM K. KOUYOUMJIAN
BY
Lawrence K. Sager
his ATTORNEY

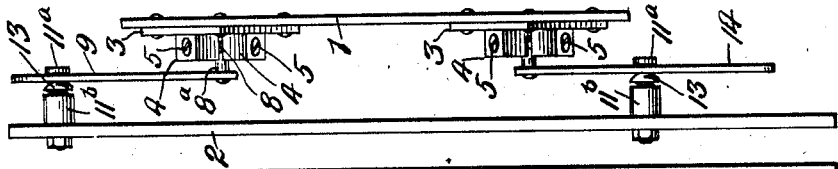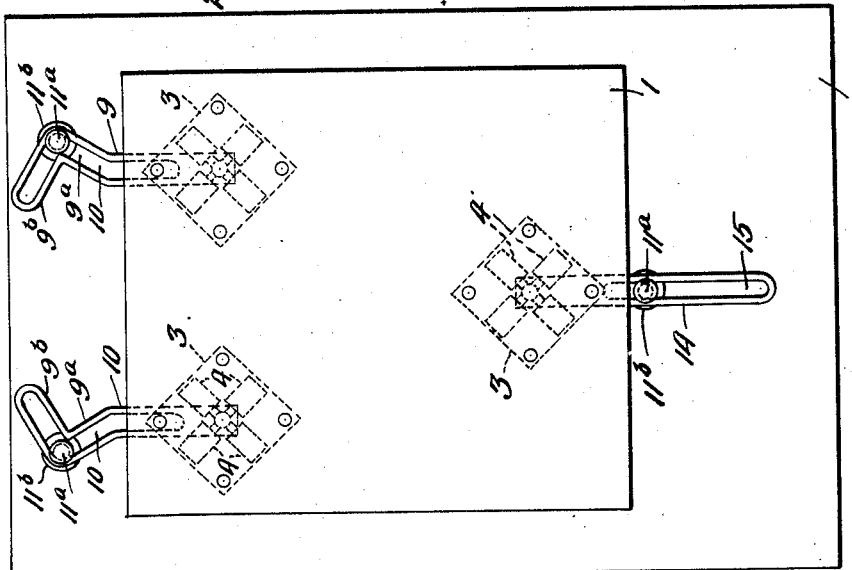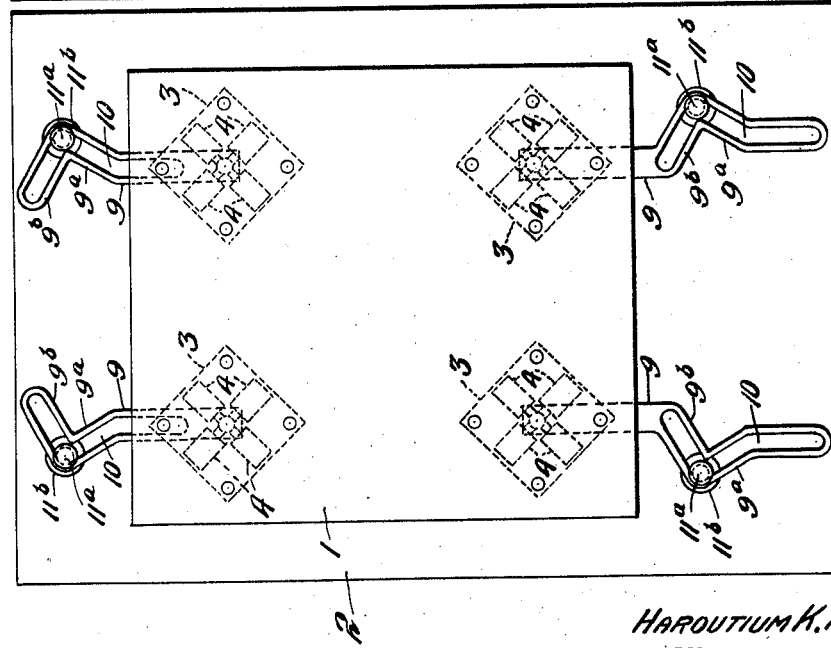

Patented Nov. 30, 1943

2,335,425

UNITED STATES PATENT OFFICE 2,335,425

APPARATUS FOR REDUCING EFFECTS OF SHOCKS

Haroutium K. Kouyoumjian, Wakefield, R. I.

Application April 30, 1942, Serial No. 441,063

15 Claims. (Cl. 248—358)

This invention is particularly applicable to the support of panels or plates upon which various forms of controlling apparatus are mounted and also to the support of individual devices, such as motors or other devices where an individual support is desirable and to the support of cabinets or rooms containing various apparatus, such as radio reception and transmitting rooms and in general where it is desired to protect devices or an assembly of devices from severe shocks which might otherwise damage the apparatus, or impair its accuracy or efficiency. It is well adapted for use on ships, submarines and aeroplanes for protecting apparatus from severe shocks and jars.

Apparatus which this invention is adapted to protect from severe or unusual shocks or jars, is normally adapted to withstand usual or ambient vibrations in locations where it is to be installed but when subjected to unusual shocks or jars, the apparatus, in its accuracy of response, may be seriously impaired, or result in complete failure to function. The present invention affords protection from shocks above ambient vibrations and wherein the disturbing force exceeds a predetermined amount.

This invention is an improvement upon the invention disclosed and claimed in my pending application, Serial No. 389,843, filed April 23, 1941.

The main object of the present invention is to provide an improved form of structure and method for reducing the effect of shocks to a greater degree than that disclosed in my prior application and which will be highly efficient in protecting apparatus from the effects of shocks and likewise in protecting controlling apparatus and instruments and their parts from interference with their normal functions and in avoiding damage or dislocation of the parts. Another object is to accomplish these results with an improved structure which will reduce the effects of shocks regardless of the direction or plane in which the shock producing force occurs. Another object is to accomplish this by simple and inexpensive forms of structure which will be dependable over long continued use without attention. Another object is to provide a structure which is generally applicable to the protection of individual units ranging from small and delicate instruments to very large and heavy devices, or to a collection of devices mounted on a common support, or to a cabinet or room within which various forms of devices and apparatus may be assembled. Another object is to provide an improvement which may be readily designed as to the character and size of the component parts to meet particular requirements. Other objects and advantages will be understood from the following description and accompanying drawings which disclose various embodiments of the invention.

Fig. 1 is a front elevation showing one embodiment of the invention; Fig. 2 is a side view thereof; Fig. 3 is an enlarged rear view partly in section of a portion of the apparatus of Fig. 1; Fig. 4 is a side view of Fig. 3; Fig. 5 is a front elevation of another embodiment of the invention; Fig. 6 is a front elevation of a modified form; and Fig. 7 is a side view thereof.

The reduction of effects of mechanical shocks may be accomplished by yieldable means which withstand the entire shock. This may be accomplished by various means but in all such cases, by reason of the fact that the yieldable means is subjected to the full effects of the shock, the burden put upon such means is so great that under severe shocks it necessarily follows that the protection of sensitive apparatus is insufficient; and in the case of relays or indicating instruments the movable parts may be subjected to such resultant effects as to disturb their normal functions.

Another method of reducing the effects of shocks is to avoid the transmission of the shock to a greater or lesser degree, the greater the avoidance the less the shock received. The present invention combines these two methods in a manner which obtains the advantages of both and secures a very efficient reduction of shock effects with ample protection of the apparatus or object requiring protection.

If it be assumed that the support receiving the impact can move in the direction of impact relatively to the object to be protected, the shock on the object will be correspondingly reduced. For example, if the support could be moved sufficiently in the direction of impact without transmitting any movement to the object to be protected, obviously the object would receive no shock. If the support be moved to a lesser degree, then some movement and shock is imparted to the object, the greater the permitted movement of the support relatively to the object the less the remaining shock on the object. Obviously there is a practical limit to the movement of the support relatively to the object and this results in the necessity of providing some yieldable means for reducing the remaining shock effects. This invention combines these two methods of control with mutual interactions of each and with highly advantageous results.

In this combined relationship the peak or greatest severity of the shock is overcome by introducing means which avoids or greatly reduces the transmission of the initial movement of the support to the yieldable means. This results in the yieldable means being burdened with only a comparatively small portion of the initial shock. In carrying the principles just discussed into effect, the apparatus or object to be protected from shock is related to the support receiving the shock in a manner to permit relative movement, also to reduce the effects of shock not avoided by such movement and also to return the apparatus or object to its original position after the shock effects have passed.

Referring to Figs. 1 to 4, one form of the yieldable means is disclosed similar to one of the forms disclosed in my said prior application, although such means may be of other types, such as rubber or spring supports, although they would be less advantageous. In the particular disclosure shown, it is assumed that the apparatus to be protected is mounted upon a vertically positioned panel 1; and this panel may be considered as the object to be protected from severe shocks. The main support subjected to the shocks is assumed to be the vertical plate 2, such as a wall of a ship, aeroplane, or any other support which might be subjected to severe shocks. On the back of the panel 1 are fixed four small plate supports 3 positioned diagonally near the four corners of the panel. The supports 3 respectively carry yieldable means of the character described in my prior application. One of these is more fully shown in Figs. 3 and 4 where the support 3 is shown as having mounted thereon and fixed thereto four uniformly angularly spaced cylinders 4. The outer end of each of these cylinders is closed by an adjustable threaded nut or disk 5. At the inner end of each cylinder is a slidable disk or plunger 6 having a concave or conical exterior surface 6a. A compression spring 7 is located between the disk 5 and the plunger 6 and tends to force the plunger outwardly.

The conical surfaces of each of the four plungers are engaged respectively by the outer ends of the four prongs 8 of a spider having an outwardly extending central hub or rod 8a. The outer ends of the prongs or projections 8 are of convex or conical shape for centrally engaging respectively the outer faces of the plungers 6. The springs 7 and the plungers tend to hold the spider in its normal central position shown in Fig. 3. When the spider is displaced from its central position in any direction by a force applied to the rod 8a, the surfaces of the outer ends of the arms 8, or of one or more of them slide up on the inclined surfaces 6a thereby forcing the affected plungers inwardly against the pressure of the springs 7. The greater the displacement of the arms 8 with reference to the plungers, the greater is the opposing force of the springs. This gives a yieldable or cushioning support for the spider. When the displacing force is removed from the rod 8a, the pressure of the springs 7 forces the plungers inwardly and brings the spider back to its central position.

Each of the four rods 8a is rigidly connected respectively to the lower end of a bar or strip 9, as shown in Fig. 1. These bars extend vertically upward and are shown as having a portion 9a inclined at an angle of about sixty degrees to a horizontal. A further extension 9b from the extension 9a and in the opposite direction therefrom is shown inclined to a horizontal at an angle of about thirty degrees. The extensions 9b of the bars which are side by side extend toward each other from the junction of the extensions as do likewise the extensions 9a, thereby being positioned in reversed relationship to each other. If desired the bars which are side by side could be interchanged in which case the corresponding extensions would diverge from each other from the junction of the extensions. A continuous open slot 10 is formed in each of the bars and extends along a considerable length of the vertical portion of the bar and through the portions 9a and 9b, the slot being closed at the upper end of the bar.

At the junction of the two portions 9a and 9b of each bar and projecting freely through the slot is a rod 11 having an expanded head 11a on the front of the bar for maintaining engagement therewith. The rod 11 is fastened to or integral with an enlarged portion 11b which is bolted securely to the plate 2. A stiff compression spring 12 is positioned between the enlarged portion 11b of the supporting rod 11 and the back of the strip or rod 9. A dished washer 13 is between the front end of the spring and the back of the rod 9 with its concave side facing the spring for forming a bearing surface against the back of the rod 9. The whole assembly of the parts is particularly adapted for withstanding shocks in vertical directions, either up or down, and in horizontal edgewise directions, or components of forces in such directions, as the most severe shocks are likely to arise in such directions in the use for which this structure is particularly adapted. But the structure will reduce the effects of shocks from any and all directions. The difference in the inclination of the portions 9a and 9b of the supporting rods is for compensating for the weight of the supported parts and may be varied according to such weight. These inclinations likewise may be other than the particular values given according to requirements.

First consider an impact on the support 2 downwardly in a vertical direction. This causes the four rods 11 to move downwardly and in so doing pass into the slots of the portions 9a of the supporting rods thereby avoiding the transmission of the major portion of the shock in the direction of impact to the yieldable means by the last motion slidable connection, although some movement in a downward direction is imparted to the supporting bars 9. That is, all portions of the movement of the support receiving the shock is not correspondingly transmitted to the cushioning means in the direction of impact. This action causes the outer ends of the arms 8 to ride up somewhat on the conical surfaces of the plungers 6 forcing them against the pressure of the springs 7, thereby cushioning a portion of the shock. Another action takes place because as the rods 11 move downward in the slots of the portions 9a they force them outwardly from the position shown in Fig. 1. In view of the fact that these bars are fixed at their lower ends to the rods 8a, the arms 8 of the two left-hand sets are turned in a counter-clockwise direction and the two right-hand ones in a clockwise direction. This turning of the arms 8 causes them to ride up on the conical surfaces of the plungers 6 in the direction in which they are turned, giving a further cushioning and reduction of shock effects by the compression of the springs 7. If the impact is particularly severe, the rods 11 will pass downwardly in the vertical portions of the slots 10 giving a further turning movement to the arms 8 and a further cushioning of the shock by the action of the plungers 6 and springs 7. The particular structure in Fig. 1 with the slots in the vertical portions of the supporting bars 9 is for the purpose of withstanding greater severity of impacts in a downward vertical direction than in other directions. Thus upon receipt of the impact, the full movement of the support 2 is not transmitted to the shock absorbing means in the direction of impact which overcomes the major portion of the shock. The yieldable means is burdened with the necessity of withstanding only a comparatively small amount of the full effects of the impact during acceleration and deceleration of the main support. The effect of the impact on the panel 1 and the devices supported thereby is thus greatly minimized by the combination of the avoidance of the major effect of the impact and the cushioning of the remaining effects by the yieldable means. This permits the springs of the yieldable means to be made lighter as well as its associated parts than would otherwise be necessary. After the impact has passed, the pressure of the springs 7 against the plungers 6 forces the arms 8 to return to their central positions and thereby move the supporting arms 9 back to their normal position as shown in Fig. 1. The parts are then in readiness for withstanding further shocks.

When the impact on the support 2 is in an upward vertical direction, the rods 11 are forced along the slots of the inclined portions 9b of the supporting rods. This avoids transmission to the shock cushioning means of the major effects of the impact. It also causes some upward movement of the rods 8a which forces the arms 8 against the sides of the plungers 6 and against the pressure of the springs 7, thereby yieldably opposing a portion of the shock. It likewise causes an outward movement of the upper ends of the supporting bars 9 by the movement of the rods 11 into the slots of the inclined portions 9b. This gives a turning movement to the arms 8 which aids in cushioning the shock, the action being similar to that described with reference to a downward impact. After the passing of the shock the pressure of the springs 7 returns the parts to their normal position.

When the impact is imposed upon the main support in a horizontal direction from left to right, the rods 11 cause the supporting arms 9 to be turned in a clockwise direction relatively to the yieldable means and the rods 11 also move in the slots of the arms and thereby avoids the transmission of the major effects of the impact in the direction of the impact. This clockwise movement direction similarly turns the arms 8 forcing the plungers 6 against the pressure of the springs 7 which thereby receive the portion of the shock transmitted by the arms 8. Upon the passing of the effects of the impact the parts are returned to their normal condition. When the impact is imposed from right to left a similar action occurs.

When the impact is imposed in a horizontal direction against the back of the main support, the rods 11 move the upper ends of the supporting bars 9 forwardly and also move along the slots of the bars and thereby avoid transmitting the full movement of the rods 11 to the bars 9 in the direction of impact. The major effect of the shock is thereby avoided. This forward tilting of the supporting bars results in a similar tilting of the arms 8 and in forcing the plungers 6 against their opposing springs, thereby cushioning a portion of the shock. There is thus a combined effect of avoiding most of the shock and cushioning the remainder. When the impact is in a horizontal direction against the front of the support 2, a similar action takes place, the supporting bars 9 being tilted backwardly instead of forwardly. When the impact is in any direction other than those already considered, the action is similar as regards the components of the forces in the particular directions described, the movement of the parts and the interactions being a resultant of the component effects.

In numerous tests of apparatus like that shown in Fig. 1, including impacts from many different directions, it has been found that apparatus or devices mounted on the panel 1 have been fully protected. Such apparatus included sensitive relays, a radio receiver and indicating instruments. When subjected to extremely heavy shocks, the armatures of the relays remained in their initial positions, the operation of the radio receiver was not affected and the pointers of the indicating instruments were not disturbed sufficiently to interfere with the reading of the instruments during the shocks.

It should be noted that ambient vibrations are transmitted from the main support to the panel or object to be protected by the apparatus of this improvement because such vibrations are not sufficient to cause the plungers 6 to be depressed against the pressure of the springs 7. However, the devices to be protected from severe shocks are ordinarily made to withstand ambient vibrations. The danger of amplifying such vibrations by transmission through intervening yielding means is avoided by this invention, as well as the fatigue and deterioration of such interposed yielding means. Likewise in view of the fact that the springs 7 are not required to take the full force of the shocks, they may be made correspondingly lighter. Although the plates 3 are shown positioned so that the cylinders 4 are in diagonal relationship to the supporting bars 9, they may be otherwise placed, if desired, according to particular requirements.

Fig. 5 is similar to Fig. 1 with corresponding parts similarly numbered, the difference being that the two lower supporting bars 9 are extended downwardly instead of upwardly from the rods 8a. In Fig. 5 the intermediate portions 9b of the two lower supporting bars correspond with the upper portions 9b of the two upper bars and the portions 9a of the two lower supporting bars with their slots extended vertically downward correspond with the similar parts of the upper two bars. The arrangement of Fig. 5 may be used where it is inconvenient to mount the parts in the manner shown in Fig. 1 and where there is sufficient space for the downward location of the two lower supporting bars. The operation in withstanding shocks is similar to that described with reference to Fig. 1.

Figs. 6 and 7 show a form of structure similar to Fig. 1 except that only three supporting bars are utilized instead of four; and the structure of Figs. 6 and 7 may be used when the panel 1 and its supported objects are of less weight than the weight of similar parts supported by the panel of Fig. 1. In Figs. 6 and 7 the two upper supporting bars 9 and their related parts are the same as in Fig. 1; but the lower bar 14 is shown extending downwardly from its rod 8a and is straight throughout its length with a straight slot 15 engaged by the rod 11 connected to the main support. The bar 14 could extend upwardly from the rod 8a and connect at its upper portion with the rod 11 if desired. In operation under impacts from various directions the two upper supporting bars 9 and their connected parts function in the manner already described with reference to Fig. 1. When impacts are received in a vertical direction downwardly or upwardly, the lower supporting bar 14 functions mainly as a guide, the rod 11 moving downwardly or upwardly in the slot 15 without materially affecting the rod 8a. Upon receiving impacts in a horizontal direction from either the left or the right, the bar 14 will turn its connected arms 8 in a counter-clockwise or clockwise direction which aids in cushioning the shocks in the manner already described. When an impact is directly against the rear of the support 2 or against the front thereof, the lower supporting bar 14 will be tilted and affect its connected shock absorbing means to function in the manner already described with reference to the tilting of the supporting bars as described in connection with Fig. 1.

Although preferred embodiments of this invention have been described various modifications may be made for adaptation to particular requirements without departing from the scope thereof.

I claim:

1. Apparatus for reducing the effects of shocks comprising a supporting element subjected to shocks, an element to be protected from the shocks, yieldable shock cushioning means interposed between said elements, and mechanical connections interposed between said shock cushioning means and one of said elements for reducing the transmitted movement in the direction of impact, said mechanical connections comprising slotted bars having the slots inclined to each other and slidable rods engaging the slots of the bars.

2. Apparatus for reducing the effects of shocks comprising a supporting element subjected to shocks, an element to be protected from the shocks, a plurality of rods secured to said supporting element and extending outwardly therefrom, a plurality of slotted bars having their slots engaged freely by the ends of said rods slidable therein, the slots of said bars being inclined relatively to each other, and yieldable shock cushioning means interposed between said bars respectively and said protected element.

3. Apparatus for reducing the effects of shocks comprising a supporting element subjected to shocks, an element to be protected from the shocks, a plurality of rods secured to said supporting element and extending outwardly thereform, a plurality of slotted bars having their slots engaged freely by the ends of said rods slidable therein, certain of said bars each having angularly related slotted portions, and yieldable shock cushioning means interposed between said bars respectively and said protected element.

4. Apparatus for reducing the effects of shocks comprising a supporting element subjected to shocks, an element to be protected from the shocks, a plurality of rods secured to said supporting element and extending outwardly therefrom, a plurality of slotted bars having their slots engaged freely by the ends of said rods slidable therein, the slots of said bars being inclined relatively to each other, and yieldable shock cushioning means interposed between said bars respectively and said protected element, said yieldable means comprising yieldable elements angularly disposed in relation to each other and each of said yieldable elements having a cavity with a wall diverging from its center engaged by the connection to its respective bar.

5. Apparatus for reducing the effects of shocks comprising a supporting element subjected to shocks, an element to be protected from the shocks, a plurality of rods secured to said supporting element and extending outwardly therefrom, a plurality of slotted bars having their slots engaged freely by the ends of said rods slidable therein, certain of said bars each having angularly related slotted portions, and yieldable shock cushioning means interposed between said bars respectively and said protected element, said yieldable means comprising yieldable elements angularly disposed in relation to each other and each of said yieldable elements having a cavity with a wall diverging from its center engaged by the connection to its respective bar.

6. Apparatus for reducing the effects of shocks comprising a supporting element subjected to shocks, an element to be protected from the shocks, a plurality of yieldable shock cushioning means interposed between said elements, and mechanical connections interposed respectively between said shock cushioning means and one of said elements for reducing the transmitted movement in the direction of impact, said yieldable means comprising yieldable elements angularly disposed in relation to each other and each of said yieldable elements having a cavity with a wall diverging from its center engaged by said mechanical connections.

7. Apparatus for reducing the effects of shocks comprising a supporting element subjected to shocks, an element to be protected from the shocks, a plurality of yieldable shock cushioning means interposed between said elements, and mechanical connections having relatively movable parts interposed respectively between said shock cushioning means and one of said elements for reducing the transmitted movement in the direction of impact, said yieldable means comprising yieldable elements angularly disposed in relation to each other and each of said yieldable elements having a cavity with a wall diverging from its center engaged by said mechanical connections.

8. Apparatus for reducing the effects of shocks comprising a supporting element subjected to shocks, an element to be protected from the shocks, a plurality of yieldable shock cushioning means interposed between said elements, and mechanical connections having relatively slidable parts interposed respectively between said shock cushioning means and one of said elements for reducing the transmitted movement in the direction of impact, certain of said parts having portions inclined to each other, said yieldable means comprising yieldable elements angularly disposed in relation to each other and each of said yieldable elements having a cavity with a wall diverging from its center engaged by said mechanical connections.

9. Apparatus for reducing the effects of shocks comprising a supporting element subjected to shocks, an element to be protected from the shocks, a plurality of yieldable shock cushioning means interposed between said elements, and mechanical connections comprising slotted bars having the slots inclined to each other and slidable rods engaging the slots of the bars interposed respectively between said shock cushioning means and one of said elements for reducing the transmitted movement in the direction of impact, said yieldable means comprising yieldable elements angularly disposed in relation to each other and each of said yieldable elements having a cavity with a wall diverging from its center engaged by said mechanical connections.

10. Apparatus for reducing the effects of shocks comprising a supporting element subjected to shocks, an element to be protected from the shocks, a plurality of rods secured to said supporting element and extending outwardly therefrom, a plurality of slotted bars having their slots engaged freely by the ends of said rods slidable therein, certain of said bars each having angularly related slotted portions, the slotted portions of one bar being in reversed relation to the corresponding slotted portions of another bar, and yieldable shock cushioning means interposed between said bars respectively and said protected element, said yieldable means comprising yieldable elements angularly disposed in relation to each other and each of said yieldable elements having a cavity with a wall diverging from its center engaged by the connection to its respective bar.

11. Apparatus for reducing the effects of shocks comprising a supporting element subjected to shock, an element to be protected from shock, yieldable shock cushioning means interposed between said elements, and a mechanical lost motion connection interposed between said shock cushioning means and said supporting element for permitting limited untransmitted movement of said supporting element in the direction of impact relatively to said cushioning means and thereby avoiding the transmission of the full effect of the shock to said cushioning means by said connection.

12. Apparatus for reducing the effects of shocks comprising a supporting element subjected to shock, an element to be protected from shock, yieldable shock cushioning means interposed between said elements, and a plurality of mechanical lost motion connections interposed between said shock cushioning means and said supporting element for permitting limited untransmitted movement of said supporting element in the direction of impact relatively to said cushioning means and thereby avoiding the transmission of the full effect of the shock to said cushioning means by said connections.

13. Apparatus for reducing the effects of shocks comprising a supporting element subjected to shock, an element to be protected from shock, yieldable shock cushioning means interposed between said elements, and a mechanical lost motion connection having relatively slidable parts interposed between said cushioning means and said supporting element for permitting limited untransmitted movement of said supporting element in the direction of impact relatively to said cushioning means and thereby avoiding the transmission of the full effect of the shock to said cushioning means by said mechanical connection.

14. Apparatus for reducing the effects of shocks comprising a supporting element subjected to shock, an element to be protected from shock, yieldable shock cushioning means interposed between said elements, and a mechanical lost motion connection having relatively slidable parts interposed between said cushioning means and said supporting element for permitting limited untransmitted movement of said supporting element in the direction of impact relatively to said cushioning means and thereby avoiding the transmission of the full effect of the shock to said cushioning means by said mechanical connection, certain of said parts having portions inclined to each other.

15. Apparatus for reducing the effects of shocks comprising a supporting element subjected to shock, an element to be protected from shock, yieldable shock cushioning means interposed between said elements, and a mechanical lost motion connection interposed between said shock cushioning means and said supporting element for permitting limited untransmitted movement of said supporting element in the direction of impact relatively to said cushioning means and thereby avoiding the transmission of the full effect of the shock to said cushioning means by said connection, said connection comprising a rod fixed to said supporting element and a slotted bar engaged by said rod.

HAROUTIUM K. KOUYOUMJIAN.